Patented Feb. 27, 1923.

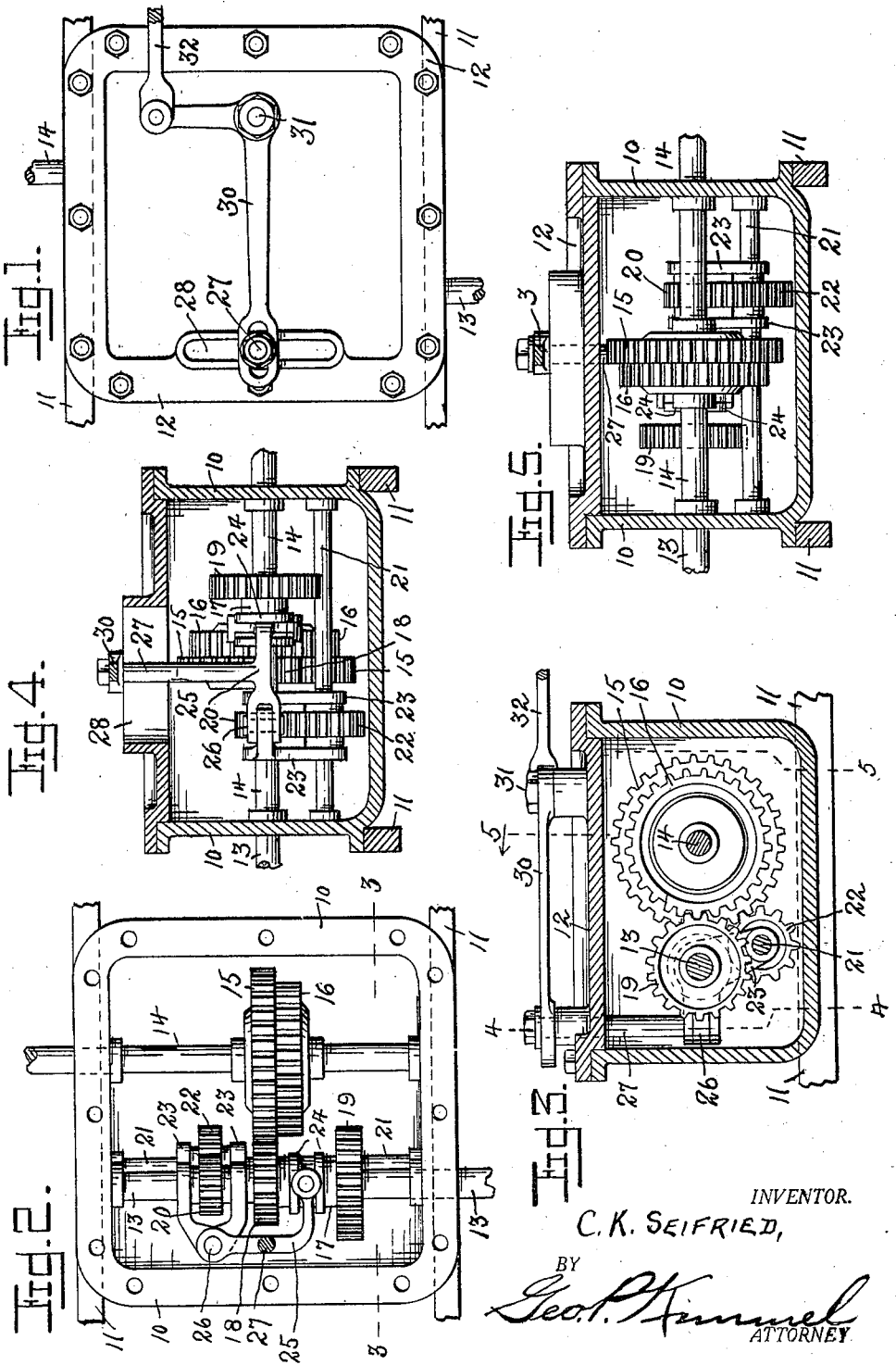

1,447,047

UNITED STATES PATENT OFFICE.

CLARENCE KAST SEIFRIED, OF GRAYVILLE, ILLINOIS.

CHANGE-SPEED GEARING AND REVERSING DEVICE.

Application filed April 20, 1921. Serial No. 462,940.

*To all whom it may concern:*

Be it known that I, CLARENCE KAST SEIFRIED, a citizen of the United States, residing at Grayville, in the county of White in the State of Illinois, have invented certain new and useful Improvements in Change-Speed Gearing and Reversing Devices, of which the following is a specification.

This invention relates to improvements in change speed and reversing gears of the class requiring one operator only to produce the different changes, and has for one of its objects to simplify and improve the construction and increase the efficiency and utility of devices of this character.

Another object of the invention is to provide a device of this character having means under the control of the operator for changing the speed, or reversing the motion by manipulating a system of levers from his position, for instance on the driver's seat of a motor driven vehicle.

With these and other objects in view the invention consists in certain novel features of construction as hereinafter shown and described and then specifically pointed out in the claim, and in the drawings illustrative of the preferred embodiment of the invention.

Figure 1 is a plan view of the improved apparatus.

Fig. 2 is a plan view with the cover of the casing removed.

Fig. 3 is an end elevation of the improved apparatus with the casing and the shafts and guide rod in section on the line 3—3 of Fig. 2.

Fig. 4 is a rear elevation with the casing in section on the line 4—4 of Fig. 3 looking in the direction of the arrow.

Fig. 5 is a front elevation with the casing in section on the line 5—5 of Fig. 2 looking in the direction of the arrow.

The improved device may be employed wherever a change speed and reversing gearing is required, but is more particularly designed for use in connection with motor driven vehicles of the tractor class, and comprises an enclosing casing 10 preferably supported upon rail members 11, and provided with a detachable cover 12.

A drive shaft 13 and a driven shaft 14 are supported for rotation through the casing 10.

Mounted on the driven shaft 14 are gears 15 and 16 of different diameters. Slidable on the shaft 13 and rotative therewith as by a feather and key device of the usual construction, is a shifter sleeve 17 having a relatively small gear 18 engageable with the larger gear 15 of the differential device when the sleeve is in one position, and a larger gear 19 engageable with the smaller gear 16 when the sleeve is in its other position. By this means the speed can be quickly changed by shifting the sleeve 17 and its coacting gears 18 and 19, as will be obvious. Slidable on the shaft 13 and rotative therewith by a feather and key device, is a relatively small gear 20. Extending between the ends of the casing 10 is a guide rod 21, and slidable on the rod is a larger gear 22 in constant engagement with the smaller gear 20. The shaft 13 and rod 21 are coupled by bars 23 at each side of the gears 20 and 22, so that the gears are moved together when a shipper device is applied, for instance to the bars 23.

The sleeve 17 is provided with spaced annular stop ribs 24 with which a shipper arm 25 engages, the latter pivoted at 26 to the members 23 at their juncture and provided with an upwardly directed standard 27, the latter extending through a guide slot 28 in the cover 12, as shown.

Any suitable means may be employed for simultaneously actuating the gears 18, 19 and 20, but for the purpose of illustration a suitable means is shown for producing the requisite movement, consisting in a bell crank lever 30 pivoted at its elbow at 31 to the cover 12 and with a shifting rod 32 pivoted at one end to one arm of the lever 30 and leading to a point convenient to the driver on the seat of the vehicle. The other arm of the lever 30 is coupled to the standard 27.

By this arrangement it will be obvious that when the rod 32 is adjusted to dispose the standard 27 in its central or neutral position, the gear 18 will be engaged with the larger gear 15 and produce slow or "low" speed. If the standard 27 is moved in one direction, the larger gear 19 will be engaged with the smaller gear 16 and thus produce greater or "high" speed. Then if the standard 28 be moved in the opposite direction, the gear 22 will be engaged with the larger gear 15 and reverse the motion by reason of the interposed idler gear 20, which is small enough to pass the gear 15 without engaging with it, but permitting the gear 22 to engage the gear 15.

By this arrangement the gears 18, 19, 20 and 22 may be simultaneously shifted longitudinally of the shaft 13 and rod 21 by power applied to the shifter rod 22.

The improved device is simple in construction, can be inexpensively manufactured and operates effectually for the purposes described.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:—

In an apparatus of the class described, a drive shaft adapted to be rotated and carrying gear wheels of different diameters, a counter shaft adapted to be rotated, a sleeve slidable on said counter shaft and rotative therewith, gears of different diameters carried by said sleeve in spaced relation and adapted to be alternately engaged with the gears of the drive shaft, a gear on said counter shaft, a guide rod, a gear slidable on said guide rod and constantly engaged with the gear of said counter shaft, arms coupling the counter shaft and guide rod and supporting the gears of the same, and coupling means between said arms and sleeve whereby the arms and sleeve may be simultaneously actuated.

In testimony whereof, I affix my signature hereto.

CLARENCE KAST SEIFRIED.